United States Patent [19]

Wrobel

[11] Patent Number: 5,583,170
[45] Date of Patent: Dec. 10, 1996

[54] MIXTURES WITH SELF-LUBRICATING PROPERTIES

[75] Inventor: Dieter Wrobel, Leverkusen, Germany

[73] Assignee: Bayer Aktiengesellschaft, Leverkusen, Germany

[21] Appl. No.: 539,493

[22] Filed: Oct. 6, 1995

Related U.S. Application Data

[63] Continuation of Ser. No. 326,179, Oct. 19, 1994, abandoned.

[30] Foreign Application Priority Data

Oct. 26, 1993 [DE] Germany .......................... 43 36 472.1
Mar. 15, 1994 [DE] Germany .......................... 44 08 660.1

[51] Int. Cl.$^6$ ........................................ C08K 5/52
[52] U.S. Cl. ........................ 524/140; 524/141; 524/143; 524/147; 524/151; 524/588
[58] Field of Search ................................ 524/140, 141, 524/143, 147, 151, 588

[56] References Cited

U.S. PATENT DOCUMENTS

| | | | |
|---|---|---|---|
| 2,618,600 | 11/1952 | Moreton. | |
| 2,684,336 | 7/1954 | Moreton. | |
| 3,288,743 | 11/1966 | Spalding | 524/141 |
| 4,101,499 | 7/1978 | Herzig | 260/375 B |
| 4,248,976 | 2/1981 | Clubley et al. | 524/143 |
| 4,497,692 | 2/1985 | Gelchinski et al. | 204/15 |
| 4,745,144 | 5/1988 | Itoh et al. | 524/141 |
| 5,080,260 | 1/1992 | Düring | 222/107 |
| 5,412,014 | 5/1995 | Romenesko | 524/143 |

FOREIGN PATENT DOCUMENTS

| | | | |
|---|---|---|---|
| 520186 | 12/1992 | European Pat. Off. | 524/141 |
| 2372203 | 6/1978 | France. | |
| 4016417 | 11/1991 | Germany | 524/141 |

OTHER PUBLICATIONS

Database WPI, Derwent Publications Ltd., London, GB; An 82–86508 & JP–A–57 141 476 (Haraden Koji KK.), 1. Sep. 1982.

W. Noll, Chemistry and Technology of Silicones, Academic Press, pp. 283–284, (1968).

Primary Examiner—Mark D. Sweet
Attorney, Agent, or Firm—Sprung Horn Kramer & Woods

[57] ABSTRACT

The invention relates to a novel curable mixture comprising a silicone rubber a), at least one aryl phosphoric acid ester b) and optionally at least one further additive c), the improvement wherein the aryl phosphoric acid ester b) is silicone incompatible, whereby upon curing of the mixture the cured product is self-lubricating.

11 Claims, No Drawings

MIXTURES WITH SELF-LUBRICATING PROPERTIES

This application is a continuation of application Ser. No. 08/326,179, filed Oct. 19, 1994, now abandoned.

The present invention relates to mixtures with self-lubricating properties in the cured state, containing at least one cross-linkable silicone rubber (a), at least one aryl phosphoric acid ester b) and at least one further additive c), a method for their manufacture and moldings based on these mixtures.

Self-lubricating silicones are known per se.

DESCRIPTION OF THE PRIOR ART

According to EP 369 255 copolymers containing diethylsiloxy and diphenylsiloxy units with a significant proportion of diphenylsiloxy groups are regarded as only partially suitable for this purpose, since the exudation behavior is frequently unpredictable and the lubricating effect often fails to materialize.

This disadvantage is said not to be possessed by short-chain OH-end-stopped diorganosiloxanes with trifluoropropyl groups in peroxidically cross-linked systems (EP 369 255).

Such OH-end-stopped oils, however, are not suitable for addition cross-linking silicone rubbers containing hydrogen siloxanes as cross-linkers. During the cross-linking reaction, in addition to the vinyl groups of the polymers, the OH-end-stopped polymers also react with the hydrogen siloxanes with formation of an SiOSi bond:

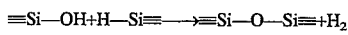

They are also incorporated into the network and can no longer migrate to the surface and form a lubricating film there.

In addition, both types of oil possess further disadvantages. They consist of polymers of varying chain length, which inevitably cause fluctuating molecular weight distributions. Accordingly the exudation behavior also fluctuates to a greater or lesser degree. A further disadvantage for commercial use lies in the high prices of these special silicone oils.

The use of phosphoric acid esters in peroxidic silicone rubbers for improving the resistance to dynamic fatigue is described in U.S. Pat. No. 4,745,144. However, only silicone-compatible phosphoric acid esters, for example, such as tributyl phosphate, are suitable for this purpose. An explicit warning is given against use in addition systems which cure by means of the hydrosilylizing reaction, since there is the risk of the catalyst being poisoned by the phosphorus-containing substances.

OBJECT OF THE INVENTION

The object of the present invention is therefore the provision of mixtures which exhibit self-lubricating properties in the cured state.

It has now been found that the addition of at least one aryl phosphoric acid ester not compatible with the silicone materials and at least one further additive does not lead to poisoning phenomena of the catalyst and that in contrast to the trialkyl phosphates known to date (e.g. tributyl phosphate) the formation of a lubricating film takes place.

BRIEF DESCRIPTION OF THE INVENTION

The present invention provides mixtures with self-lubricating properties in the cured state, which contain at least one silicone rubber a), at least one aryl phosphoric acid ester b) and at least one further additive c), in which the aryl phosphoric acid ester used is silicone-incompatible.

DETAILED DESCRIPTION OF THE INVENTION

Silicone rubbers a) for the purpose of the invention are substances known per se, such as are described e.g. in W. Noll "Chemistry and Technology of Silicones", 1968, page 246. Component a) preferably corresponds to a silicone rubber with the following formula (II)

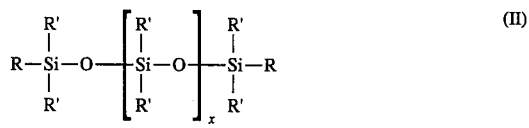

in which R and R' are alkyl residues with 1 to 8 carbon atoms, aryl residues, vinyl residues and fluoroalkyl residues with 3 to 8 carbon atoms, so that the polymer contains 0.0002 to 3 wt. % vinyl groups, and x is varied so that the viscosity of the polymer extends from 0.1 to 30 000 Pa.s.

The silicone rubber can optionally contain fillers and water repellents.

Water repellents for the purpose of the invention are preferably silanol-containing silicone compounds with a viscosity of 0.01 to 1 Pa.s and/or hexaalkyl disilazanes, wherein the organic groups are selected from among alkyl residues with 1 to 8 carbon atoms, vinyl residues, aryl residues and fluoroalkyl residues with 3 to 8 carbon atoms so that the silicone compounds have a silanol content (SiOH-content) of 2 to 10% by weight.

Examples of suitable fillers for the method according to the invention include pyrogenic or precipitated, finely divided silicas with a BET surface area of 50 to 500 m²/g. Such fillers can be surface-modified, e.g. with organosilicon compounds. The modification can also be achieved during the working into the polymer by the addition, for example, of hexamethyl disilazane and/or 1,3-divinyl-1,1,3,3-tetramethyl disilazane with the addition of water.

Substances such as diatomaceous earths, finely divided quartz powders, amorphous silicas or carbon blacks can also be used as fillers.

In a further embodiment of the present invention the silicone rubber a) can be both an addition cross-linking silicone rubber with hydrogen siloxane as cross-linker a') and a peroxidically cross-linkable silicone rubber a").

In addition to cross-linking systems a') the mixture contains as cross-linkers preferably of the formula hydrogen siloxanes

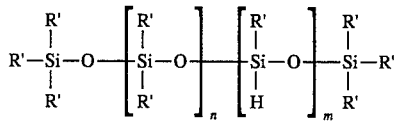

wherein R' independently are alkyl residues with 1 to 8 carbon atoms or aryl and fluoroalkyl residues with 3 to 8 carbon atoms, m≧3 and n+m are varied so that the polymer has a viscosity of 0.005 to 1 Pa.s, as well as additionally a rhodium or platinum catalyst and optionally inhibitors and further auxiliaries.

The platinum catalysts are the catalysts used conventionally for addition cross-linking systems, in particular Pt(O) complexes with vinyl siloxanes as ligands.

There are suitable as inhibitors acetylenic alcohols such as 2-methylbutin(3)-ol-(2), ethinyl cyclohexanol, tetramethyltetravinylcyclotetrasiloxane or tetramethyldivinyldisiloxane.

Instead of the hydrogen siloxanes and the catalyst peroxidically cross-linking materials preferably contain alkyl or aryl peroxides such as dicumyl peroxide, 1,4-bis(tert.-butylperoxy)-1,4-dimethylhexane, 2,4-dichlorobenzoyl peroxide and 4-methylbenzoyl peroxide.

The aryl phosphoric acid esters used according to the invention are as a rule commercially available products. In the mixtures according to the invention the aryl-phosphoric acid ester b) preferably have the general formula (I)

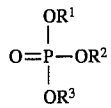

in which $R^1$ and $R^2$ signify phenyl, alkylphenyl, α-methylbenzylphenyl or alkyl residues, and $R^3$ phenyl, alkylphenyl or α-methylbenzylphenyl, residues.

There are preferably used as alkyl residues linear $C_1$–$C_8$ residues.

Additives c) for the purpose of the invention are preferably unreactive, non-inhibiting, silicone-incompatible oils, such as for example trifluoropropylmethyl silicone oil, paraffin oil and process oils, such as adipic acid esters and polyesters.

The level of the addition of aryl phosphoric acid ester b) is determined in the main by the hardness of the vulcanisate and the desired extent of the exudation as well as the degree of incompatibility of the aryl phosphoric acid ester.

In the mixtures according to the invention the amount of the aryl phosphoric acid ester preferably comes to 0.5 to 10 wt. %, particularly preferably 3 to 10 wt. % and the amount of the additives preferably to 0.5 to 5 wt. %, calculated on the total mixture.

Preferably the mixtures according to the invention exhibit the following composition:

100 parts by weight of a polysiloxane or a mixture of several polysiloxanes of formula (II)

0.1 to 10 parts by weight of at least one water repellent, 0 to 200 parts by weight of filler, 3 to 10 parts by weight of a phosphoric acid ester of formula (I), calculated on the total mixture 0.5 to 5 per cent by weight of additives, calculated on the total mixture, and for the addition cross-linking system:

1 to 50 parts by weight of a cross-linker and 1 to 250 ppm of a platinum or rhodium catalyst as well as optionally inhibitors and further auxiliaries, and for the peroxidically cross-linking system:

0.1 to 3 per cent by weight peroxides, calculated on the total mixture.

The present invention also provides a method for manufacturing these silicone materials, according to which components a) to c) are stirred with one another.

The present invention also provides moldings with self-lubricating properties, obtainable by introducing components a) and b) and optionally c) into a mold and subsequent vulcanization at excess pressure and a temperature of 50° to 250° C.

After 1 to 3 days' storage at room temperature there forms on the surface of the moldings a film of oil which can be recognized under microscopic examination as a stringing together of many small droplets.

The invention will further described in the following illustrative examples wherein parts are parts by weight.

Example 1 (According to the Invention)

In a kneader 47 parts by wt. of vinyl-end-stopped polydimethyl siloxane with a viscosity of 10 Pa.s are mixed with 4 parts by wt. of hexamethyl disilazane, 0.3 parts by wt. tetramethyldivinyl disilazane and 3 parts by wt. of water and then kneaded to a homogeneous mass with 18 parts by wt. of pyrogenically produced silica with a specific surface area of 300 m²/g to BET (working in of the filler according to U.S. Pat. No. 4,101,499). The mixture was first heated to 130° C. and stirred for 1.5 hours in the closed kneader and thereafter freed from water and surplus silazane at 160° C. under vacuum. After cooling of the compound the mixture is mixed with the following additives and vulcanized:

90 g of this silicone-based composition is mixed with 1.53 g of a trimethylsilyl-end-blocked polyorganosiloxane cross-linker containing on average 5 methylhydrogen siloxane units and 3 dimethyl siloxane units per molecule, 0.15 g of a platinum catalyst in the form of a complex of chloroplatinic acid with symmetrical divinyltetramethyl disiloxane and containing 0.65% platinum and some 0.02 g 3,5-dimethyl-1-hexin-3-ol as inhibitor and 1.5 parts of diphenylcresyl phosphate and cured under pressure for 10 minutes at 175° C. in a 2 mm thick compression mold. After 1 day's storage at room temperature the surface of the plate is covered with a thin film of oil.

Example 2 (Comparison)

As in Example 1, but with 1.5 parts by wt. of tributyl phosphate instead of diphenylcresyl phosphate.

After 1 day's storage at room temperature the surface is dry.

Example 3 (Comparison)

As in Example 1, but with 9 parts by wt. of tributyl phosphate instead of diphenylcresyl phosphate.

After 1 day's storage at room temperature the surface is dry.

Example 4 (According to the Invention)

As in Example 1, but with 6.4 wt. parts of tri(isopropylphenyl)phosphate instead of diphenylcresyl phosphate.

After 1 day's storage at room temperature the surface is covered with a thin film of oil.

Example 5

General instructions on manufacturing the aryl phosphoric acid esters used a. Manufacture of the α-methylbenzyl-substituted phenol To a mixture of 3.0 mols of phenol or a phenol derivative and 0.15 mol $POCl_3$, 2.0 mols of styrene are added slowly drop-wise at 130° to 140° C.

The crude product obtained after complete addition and quieting down of the exothermic reaction is used without further purification in b) (cf. EP 408 928).

b. Manufacture of the aryl phosphoric acid ester

In a three-neck flask the crude product described under a) is reacted at temperatures of about 300° C. with 1 mol of POCl$_3$ until completion of hydrogen chloride separation. The surplus of the phenol derivative used and any portions of phosphoric acid-diarylester chlorides present are washed out on completion of the reaction with cold dilute sodium hydroxide solution (cf. F. R. Atherton, H. T. Howard and A. R. Todd, Soc. 1948, 1106).

Example 6 (According to the Invention)

As in Example 1, but with 3.1 parts by wt. of an aryl phosphoric acid ester from Example 5 of the formula

O=P(OR)$^1$(OR$^2$)(OR)

with R$^1$=R$^2$=R$^3$=α-methylbenzylphenyl instead of diphenylcresyl phosphate (A stage). The vulcanisate is then stored in hot air for 4 hours at 200° C. (B stage). Both curing stages (A and B stage) after 1 day's storage at room temperature show a thin film of oil on the surface.

Example 7 (According to the Invention)

As in Example 1, but with 4 parts by wt. of 2-ethylhexyldiphenyl phosphate instead of diphenylcresyl phosphate.

After 1 day's storage at room temperature the surface is covered with a thin film of oil.

Example 8

100 parts by wt. of a dimethyl polysiloxane (0.02% vinylsiloxy units) with a chain length of 6000 units and a viscosity of 20.10$^6$ mPas, ends capped by trimethylsiloxy groups, are mixed with 53.5 parts by wt. of a silica with a surface area according to BET of 200 m$^2$/g in a kneader at 150° C. There are added as processing auxiliaries 3.7 parts by wt. of a siloxanol with 18% SiOH groups and 4.2 parts of a siloxanol, which in addition contains 5% of vinylmethylsiloxy units, and 0.55 part of hexamethyl disilazane.

Example 9

200 g of this silicone-based mixture from Example 8 are mixed on a roll with 8 g of diphenylcresyl phosphate, 2 g of pyrogenically manufactured silica with a specific surface area of 300 m$^2$/g to BET and 3 g of a 50% paste mixture of bis(2,4-dichlorobenzoyl)peroxide in silicone oil and cured under pressure for 10 minutes at 125° C. in a 2 mm thick compression mold. After 1 day's storage at room temperature the surface of the plate is covered with a thin film of oil.

Example 10

As in Example 9, but with 1.2 g of dicumyl peroxide as peroxide and a curing temperature of 175° C.

After 1 day's storage at room temperature the surface is covered with a thin film of oil.

Example 11 (Comparison)

As in Example 1, but with 1.5 parts of a copolymer oil consisting of dimethylsiloxy and diphenylsiloxy units with a viscosity of 300 mPa.s and a refractory index of 1.5135 at 20° C. instead of 1.5 parts of diphenylcresylphosphate. After 3 day' storage at room temperature the surface is dry.

Example 12 (According to the Invention)

As in Example 11, but additionally with 0.6 parts of diphenylcresylphosphate.

After 3 days' storage at room temperature the surface is covered with a thin film of oil.

Example 13 (According to the Invention)

As in Example 11, but additionally with 1.0 parts of diphenylcresyl phosphate.

After 1 day's storage at room temperature the surface is covered with a thin film of oil.

Example 14 (According to the Invention)

As in Example 11, but with 0.5 parts of copolymer oil (from Example 11) and additionally 1.1 parts of diphenylcresyl phosphate. After 1 day's storage at room temperature the surface is covered with a thin film of oil.

Example 15 (Comparative Example)

As in Example 11, but with 1.9 parts of copolymer oil (from Example 11). After 1 day's storage at room temperature in repeat trials the surface properties fluctuate from dry to slightly lubricating.

Example 16 (According to the Invention)

As in Example 15, but additionally with 0.5 parts of diphenylcresylphosphate. After 1 day's storage at room temperature the surface is covered with a thin film of oil.

It will be understood that the specification and examples are illustrative but not limitative of the present invention and that other embodiments within the spirit and scope of the invention will suggest themselves to those skilled in the art.

I claim:

1. A curable mixture consisting essentially of, by weight,
   a) 100 parts of at least one cross-linkable silicone rubber, and
   b) 0.5 to 10 parts, calculated on the total mixture, of at least one silicone incompatible water repellent aryl phosphoric acid ester selected from the group consisting of tri(isopropyl) phenyl phosphate, 2-ethylhexyldiphenyl phosphate, diphenylcresyl phosphate and alphamethylbenzylphenyl phosphate whereby upon curing of the mixture the cured product is self-lubricating, and optionally
   c) an unreactive, non-inhibiting, silicone-incompatible oil, fillers or both.

2. A mixture according to claim 1, wherein the cross-linkable silicone rubber is (a) a polysiloxane of the formula $$R-\underset{\underset{R'}{|}}{\overset{\overset{R'}{|}}{Si}}-O-\left[\underset{\underset{R'}{|}}{\overset{\overset{R'}{|}}{Si}}-O\right]_x-\underset{\underset{R'}{|}}{\overset{\overset{R'}{|}}{Si}}-R$$

in which

R and R$^1$ each independently is alkyl with 1 to 8 carbon atoms, vinyl or fluoroalkyl with 3 to 8 carbon atoms, a sufficient quantity being vinyl groups to impart to the ultimate product 0.0002 to 3 wt. % of cured vinyl groups, and x has a value so that the cured product has a viscosity of from 0.1 to 30 000 Pas.

3. A mixture according to claim 1, wherein the silicone rubber (a) is addition cross-linkable with hydrogen siloxane as cross-linker.

4. A mixture according to claim 1, wherein the silicone rubber (a) is peroxidically cross-linkable.

5. A mixture according to claim 1, further containing (c) an unreactive, non-inhibiting, silicone-incompatible oil.

6. A mixture according to claim 5, wherein said additive (c) is present in an amount of 0.5 to 5 parts by weight.

7. A mixture according to claim 1, further containing c) 1 to 50 parts by weight of a cross-linker, and d) 1 to 250 ppm of a platinum or rhodium catalyst.

8. A mixture according to claim 1, containing (c) 0.1 to 3 parts by weight of a peroxide.

9. A self-lubricating molding produced by molding a mixture according to claim 1 and subsequently vulcanizing at excess pressure and a temperature of 50° to 250° C.

10. The mixture of claim 1 wherein said phosphate is diphenylcresyl phosphate.

11. A curable mixture comprising, by weight, a) 100 parts of at least one cross-linkable silicone rubber, and b) 0.5 to 10 parts, calculated on the total mixture, of alphamethylbenzylphenyl phosphate and wherein upon curing of the mixture, the cured product is self-lubricating.

* * * * *

UNITED STATES PATENT AND TRADEMARK OFFICE
CERTIFICATE OF CORRECTION

PATENT NO. : 5,583,170
DATED : December 10, 1996
INVENTOR(S) : Wrobel, Dieter

It is certified that error appears in the above-indentified patent and that said Letters Patent is hereby corrected as shown below:

Col. 6, line 61  Delete " $R^1$ " and substitute -- $R'$ --

Signed and Sealed this

Thirteenth Day of May, 1997

Attest:

BRUCE LEHMAN

Attesting Officer

Commissioner of Patents and Trademarks